(12) United States Patent
Rissler et al.

(10) Patent No.: US 7,870,671 B2
(45) Date of Patent: Jan. 18, 2011

(54) METHOD OF MANUFACTURING A PLATE HEAT EXCHANGER

(75) Inventors: Per Rissler, Skanör (SE); Peter Nilsson, Landskrona (SE)

(73) Assignee: SWEP International AB, Landskrona (SE)

( * ) Notice: Subject to any disclaimer, the term of this patent is extended or adjusted under 35 U.S.C. 154(b) by 1330 days.

(21) Appl. No.: 10/565,649

(22) PCT Filed: Jun. 9, 2004

(86) PCT No.: PCT/SE2004/000896

§ 371 (c)(1),
(2), (4) Date: Feb. 27, 2006

(87) PCT Pub. No.: WO2005/009669

PCT Pub. Date: Feb. 3, 2005

(65) Prior Publication Data

US 2006/0225283 A1 Oct. 12, 2006

(30) Foreign Application Priority Data

Jul. 24, 2003 (SE) .................................. 0302127

(51) Int. Cl.
*B23P 15/26* (2006.01)
*B21D 39/06* (2006.01)

(52) U.S. Cl. .............................. 29/890.043; 29/890.03; 29/890.039; 29/890.054; 165/164; 165/166; 165/167

(58) Field of Classification Search .............. 29/890.03, 29/890.033, 890.038, 890.039, 890.043, 29/890.054; 165/70, 167
See application file for complete search history.

(56) References Cited

U.S. PATENT DOCUMENTS

| | | | |
|---|---|---|---|
| 4,099,928 A | 7/1978 | Norback | |
| 4,592,414 A | 6/1986 | Beasley | |
| 5,908,070 A | 6/1999 | Kato et al. | |
| 5,913,361 A * | 6/1999 | Engstrom et al. | ............. 165/70 |
| 2003/0121649 A1 | 7/2003 | Seiler et al. | |

FOREIGN PATENT DOCUMENTS

| | | |
|---|---|---|
| GB | 2 048 130 A | 12/1980 |
| GB | 2 129 538 A | 5/1984 |
| JP | 11-257758 | 9/1999 |
| JP | 2000-199643 | 7/2000 |
| JP | 2002-035929 | 2/2002 |

* cited by examiner

*Primary Examiner*—Rick K Chang
(74) *Attorney, Agent, or Firm*—Breiner & Breiner, LLC (57) ABSTRACT

Brazed double wall plate heat exchangers are manufactured so that the double walls are connected and sealed to each other around port holes of the exchanger. This is obtained by providing areas that are shaped so as to include areas not covering each other. The brazing is provided by capillary suction of brazing material from other plate areas.

4 Claims, 11 Drawing Sheets

METHOD OF MANUFACTURING A PLATE HEAT EXCHANGER

TECHNICAL FIELD OF THE INVENTION

This invention relates to a method of manufacturing a plate heat exchanger in which each heat exchanging plate is designed as a double wall. In many applications this is specified by regulations in order to avoid that a leakage of a plate may cause one fluid medium to enter into the path of another fluid with which it should exchange heat and which might be used for human consumption. Any leakage through one of the two walls of a double walled heat exchanger plate may be detected by draining the leakage between the two walls towards the periphery of the double walled heat exchanger plate.

THE PRIOR ART

In most compact plate heat exchangers a number of stacked plates separating the flows exchanging heat are made of stainless steel and interconnected by brazing using copper or nickel as brazing material. The brazing is commonly performed by providing all plates to be sealed and connected to another plate with a thin sheet of brazing material on one side of the plate. The plates are subsequently stacked and heated in a vacuum oven to a temperature sufficient to cause brazing. A plate heat exchanger of the type equipped with plates having double walls has been shown as FIGS. 1 and 2 in the attached drawings, and as an example of a prior art patent specification reference could be made to WO 011 165 44 A1. A problem presently found in the manufacture of brazed, double wall, compact plate heat exchangers is to provide a reliable sealing around port holes in the plates preventing the flow passing the port hole from entering into the path of one or more other flows of medium passing the exchanger as well as into the small space between the double walls. The prior use of brazing material may cause unintended brazing connections between the two walls of a double wall at locations making it possible that leakage through the double wall may follow a path not leading to the space between the two walls for draining the leaking fluid to the periphery of the exchanger and—therefore—being impossible to detect.

OBJECT OF THE INVENTION

The object of the present invention is to provide a method of manufacturing a brazed, double wall heat exchanger in which the brazing material will be prevented from entering into the spaces between the two walls of any of the heat exchanger plates to such extent that it will prevent leakage of fluid through one of the double walls from entering the outwardly drained space between the two walls.

BRIEF DESCRIPTION OF THE INVENTION

The above object is achieved by a method in which a plate heat exchanger comprising a plurality of stacked plates limiting two ore more separate fluids exchanging heat across the said plates, and in which the said plates are of double wall design so as to prevent a fluid which might leak through a wall of the plates from entering into the path of another fluid, the double walls of each of the said plates being sealingly interconnected around borders of port holes in the plates—and which method according to the present invention is characterized in that each of the double walled plates of the exchanger prior to a brazing operation is provided with brazing material on a surface engaging another double walled plate, and that the areas of the mutually contacting wall surfaces of the two plates forming a double wall plate around borders of a port hole are designed so as to only partly cover each other.

The invention will be described below reference being made to the accompanying drawings.

DETAILED DESCRIPTION OF THE DRAWINGS

Figure 1:
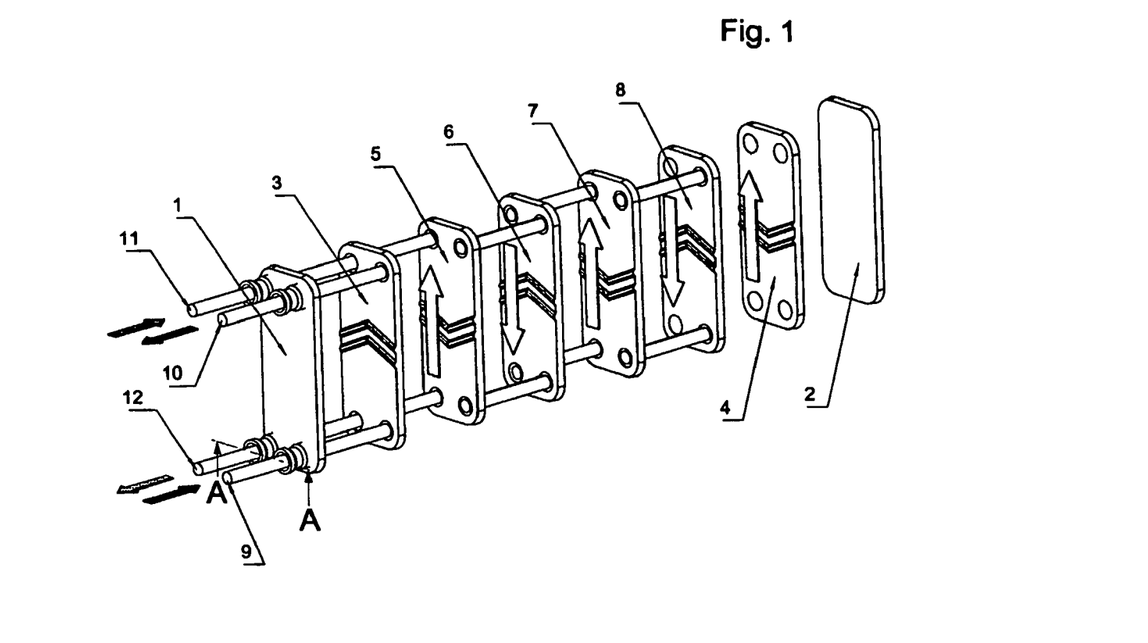
FIG. 1 is a schematic, exploded, perspective view of a plate heat exchanger of known design in which the heat exchanging plates have double walls and in which all parts of the exchanger are adapted to be interconnected by brazing.

The basic design of a two circuit plate heat exchanger is schematically shown in FIG. 1. The exchanger comprises two end plates 1 and 2, two flow guiding plates 3 and 4, and four heat exchanging plates 5-8. The plates 3-8 are provided with pressed patterns of ridges and depressions forming herring bone designs. In order to explain the two circuits of the exchanger the plates 1-8 are shown separated as an exploded view in FIG. 1. The end plate 1 is provided with an inlet opening 9 and an outlet opening 10 for a heating fluid as well as an inlet opening 11 and an outlet opening 12 for a fluid to be heated. The heating fluid is separately passed through the end plate 1 and the flow guiding plate 3 via port holes—which because of the exploded view are illustrated as a tube. A part of this heating fluid may now pass upwards between the plates 3 and 5 and subsequently to the outlet opening 10 at the end plate 1. The rest of the heating fluid is passed to the spaces between the plates 6 and 7 or between the plates 8 and 4 and is subsequently passed to the outlet opening 10. The flow to be heated is in a similar way supplied via the inlet opening 11 and passed through the space between the plates 5 and 6, or through the space between the plates 7 and 8 and is subsequently passed to the outlet opening 12. It will be understood that heat may be exchanged between the two flows of fluid via the plates 5-8. As explained above regulations may often require use of double walls (not shown in FIG. 1) in the exchanger plates 5-8 in case one of the two flows is used for consumption.

Figure 2:
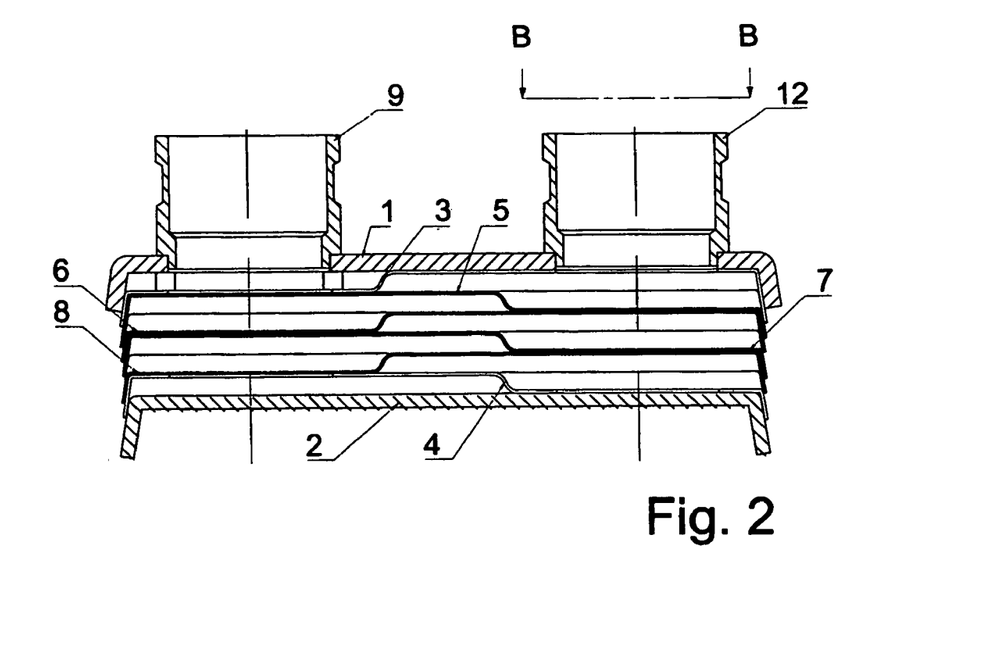
FIG. 2 at a greater scale is a section of an exchanger of the type shown in FIG. 1, the section being taken in the direction of the arrows A-A in FIG. 1.

FIG. 2 is a section indicated by the arrows A-A in FIG. 1. FIG. 2 shows the inlet opening 9 for the heating fluid and the outlet opening 12 for the heated fluid and how the plates 3-8 guiding the two flows of fluid are contacting each other to form a stack of plates of equal size and shape, but in which each other plate in the stack is turned 180 degrees in its plane relative to the neighboring plates. The double walls of the plates 5-8 are shown with thick lines.

Figure 3:
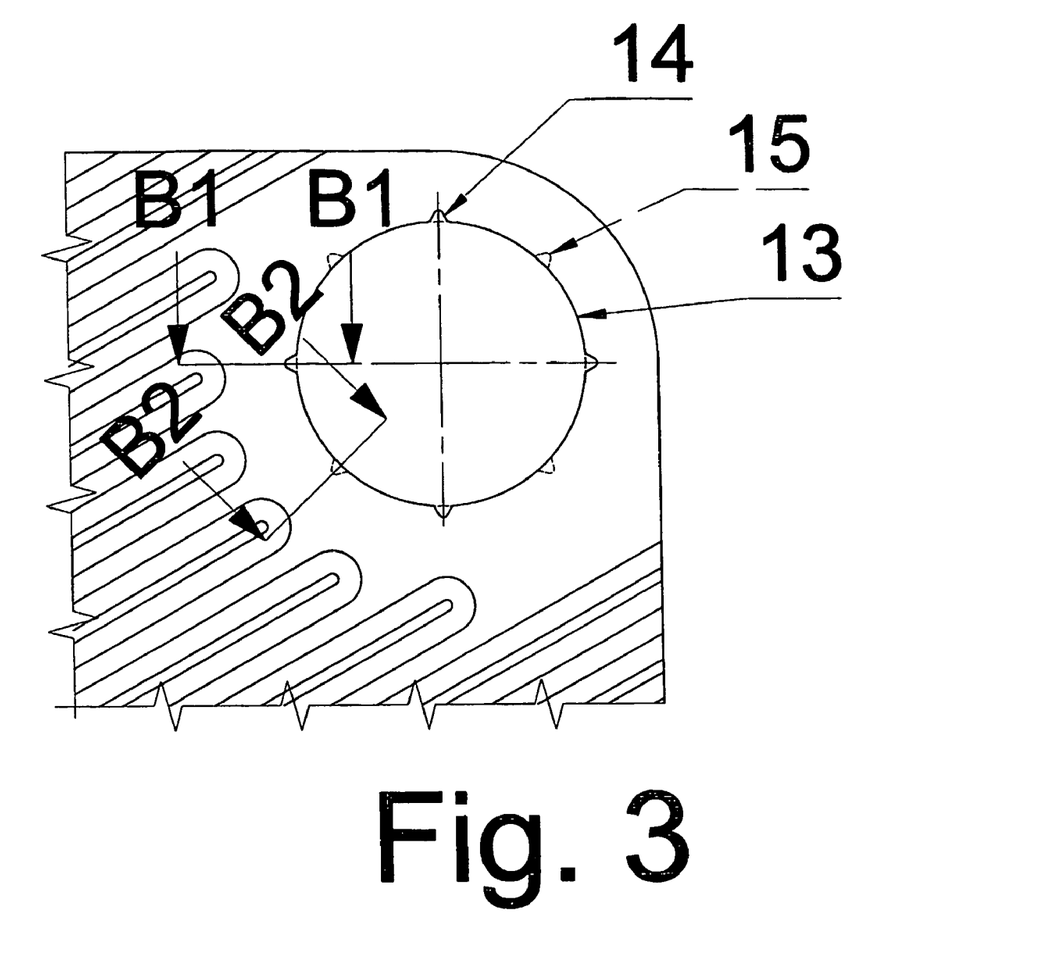
FIG. 3 at a larger scale is a plan view in the direction of the arrows B-B in FIG. 2 of a part of a stack of heat exchanging plates of an exchanger manufactured according to the invention, the part surrounding a port hole.
Figure 4:
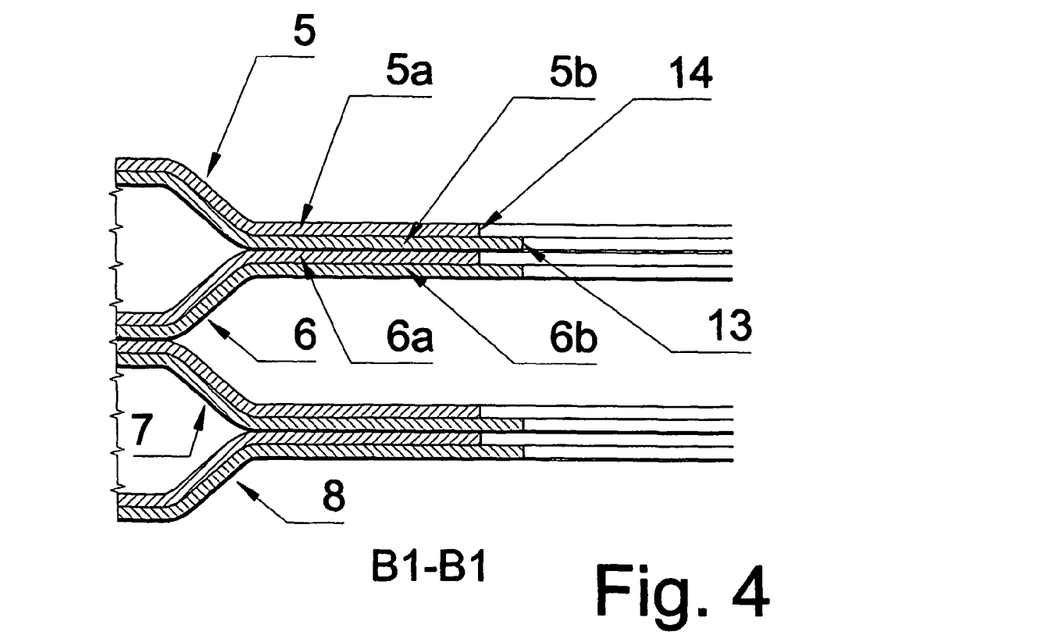
FIG. 4 at a still larger scale is a vertical section indicated by the arrows B1-B1 of FIG. 3 prior to heating for brazing.
Figure 5:
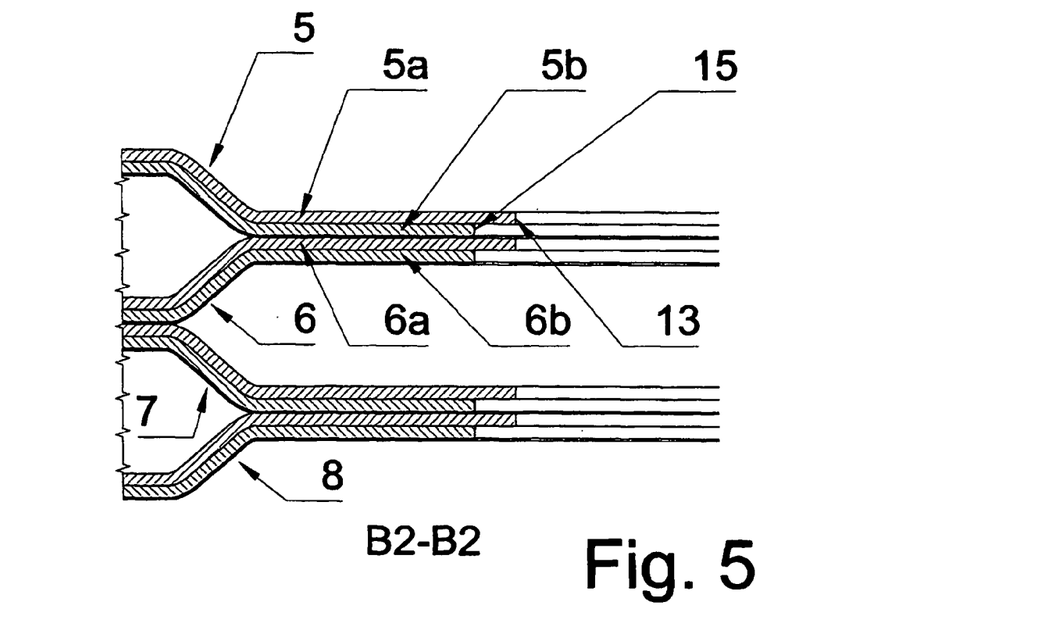
FIG. 5 is a vertical section indicated by the arrows B2-B2 of FIG. 3 prior to heating for brazing FIG. 6 corresponds to FIG. 4, but shows the condition after brazing.

In FIG. 3—which at a larger scale in the direction of the arrows B-B in FIG. 2 is a plan view of a part of a stack of heat exchanger plates in a heat exchanger according to the invention, said part surrounding a port hole—the reference numeral 13 indicates the border of the port opening in the plate 5 connecting the space between the plates 3 and 5 with the space between the plates 6 and 7. The plates 5 and 6 should be sealed and brazed together along a ring shaped contact area around the border 13 of the port opening. In FIGS. 4 and 5, which are sections indicated by the arrows B1-B1, resp. the arrows B2-B2 of FIG. 3, the plate 5 is shown as composed of two walls 5a and 5b contacting each other except for areas of the wall 5a being provided with four indentations 14 and areas of the wall 5b provided with four indentations 15.

Figure 6:
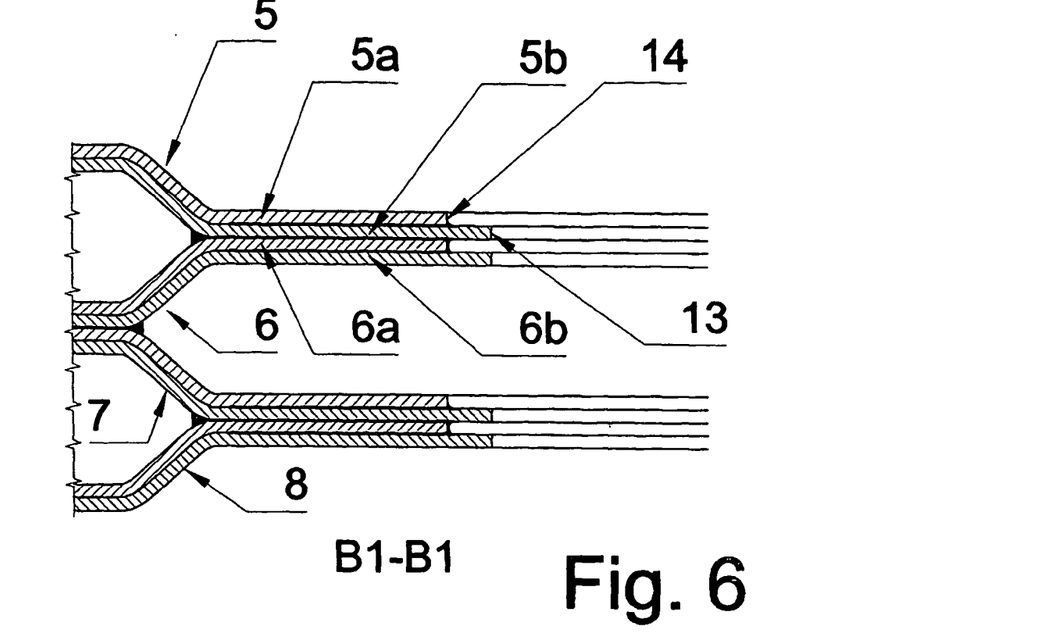
Figure 7:
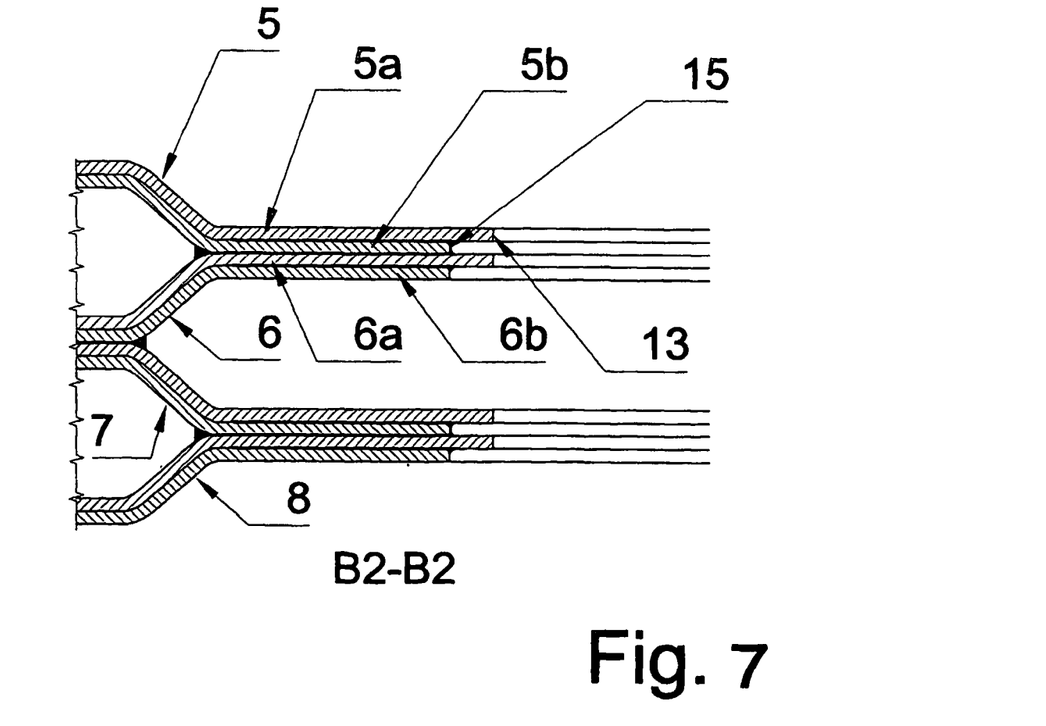
FIG. 7 corresponds to FIG. 5, but shows the condition after brazing.

As shown in FIGS. 4 and 5 the lower sides of the plates 5-8 are provided with a thin foil of brazing material—e.g. copper or nickel—illustrated as thick lines. It should be noted that no foil of brazing material is placed between the adjacent surfaces of two walls—e.g. 5a and 5b—forming a heat exchanger plate. The FIGS. 4 and 5 show the stacked plates 5-8 prior to heating in a vacuum oven to effect brazing. The FIGS. 6 and 7 correspond to the FIGS. 4 and 5 and show how the brazing material has become displaced after conventional treatment in a vacuum oven. The brazing material has almost disappeared from the lower sides of the heat exchanger plates except for the parts thereof contacting an adjacent plate. However, due to capillary suction arising where a free surface area continues into a narrow gap between two surfaces, brazing material will enter and provide a seal between the two walls 5a, 5b forming a double wall heat exchanger plate. Such free surface areas are provided by the indentations 14 and 15. The sealing brazing material has been shown by thicker lines also in FIGS. 6 and 7. The number of indentations 14 and 15 is a matter of choice and experience. The peripheral distance between them may preferably be less than 5 mm.

If desired, small ring shaped foils of brazing material may be placed between the surfaces of the double wall plates contacting each other around port openings, but not to such extent that brazing material could enter into areas in which the double walls have heat exchanging function. In most cases this use of foils of brazing material will not be needed.

Figure 8:
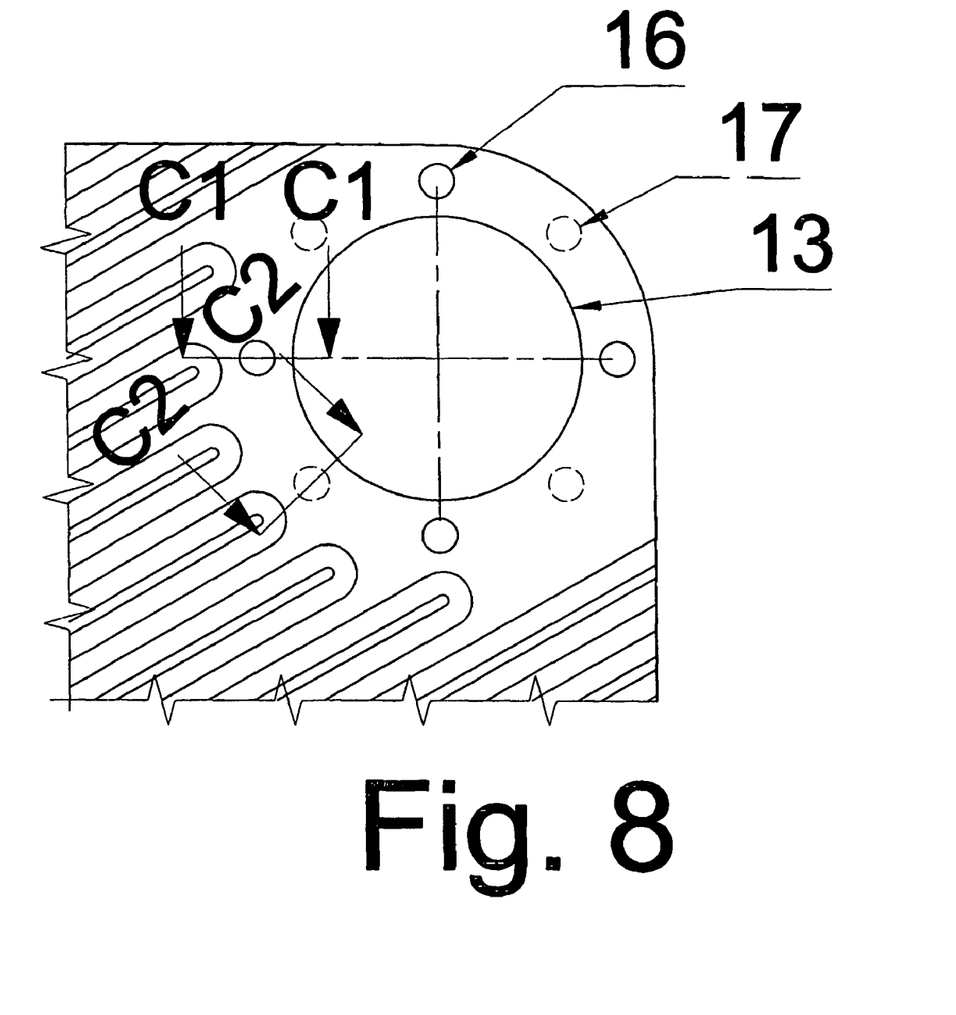
FIG. 8 shows an alternative to the exchanger shown in FIG. 3
Figure 9:
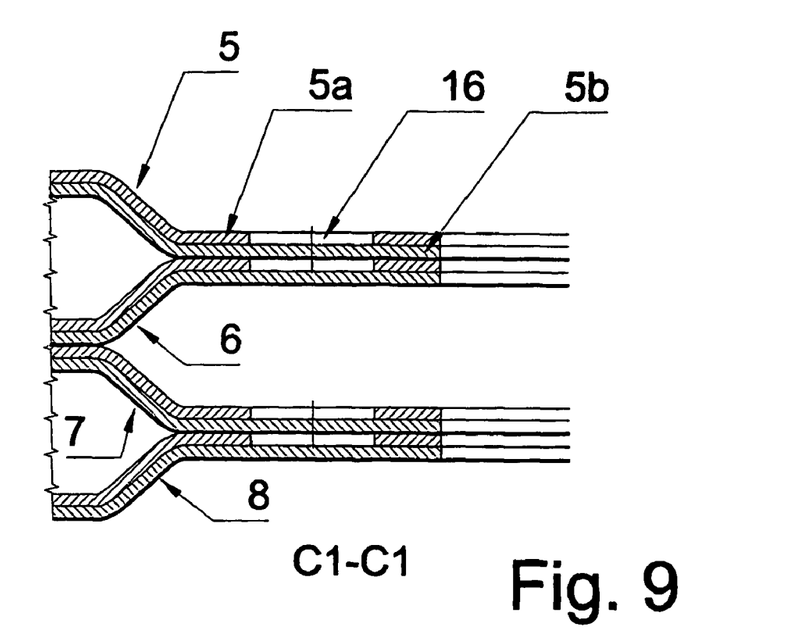
FIG. 9 is a vertical section indicated by the arrows C1-C1 of FIG. 8 prior to heating for brazing.
Figure 10:
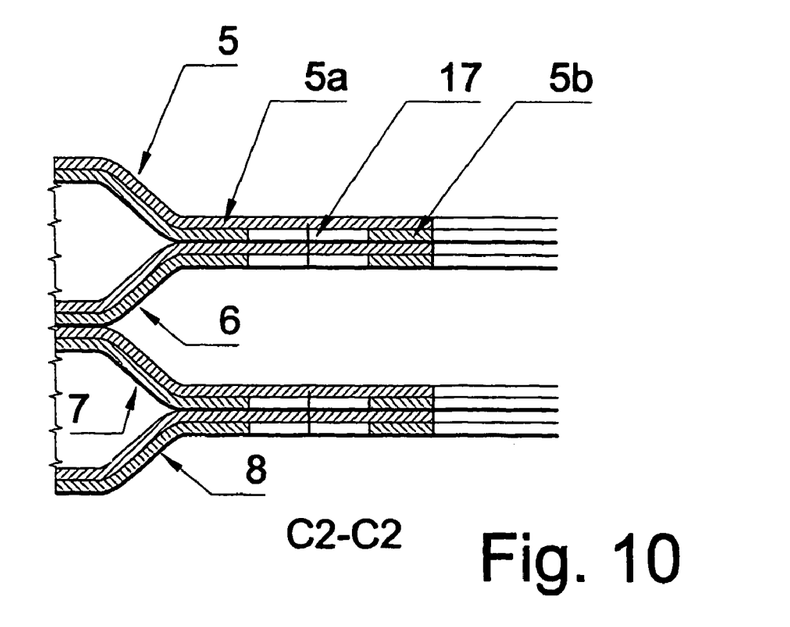
FIG. 10 is a vertical section indicated by the arrows C2-C2 of FIG. 8 prior to heating for brazing.
Figure 11:
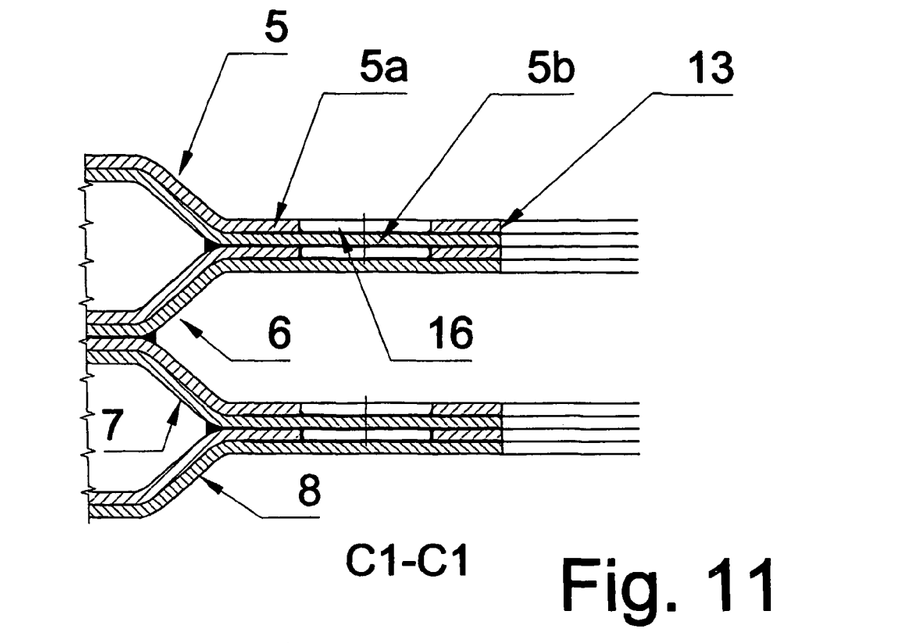
FIG. 11 corresponds to FIG. 9, but shows the condition after brazing.
Figure 12:
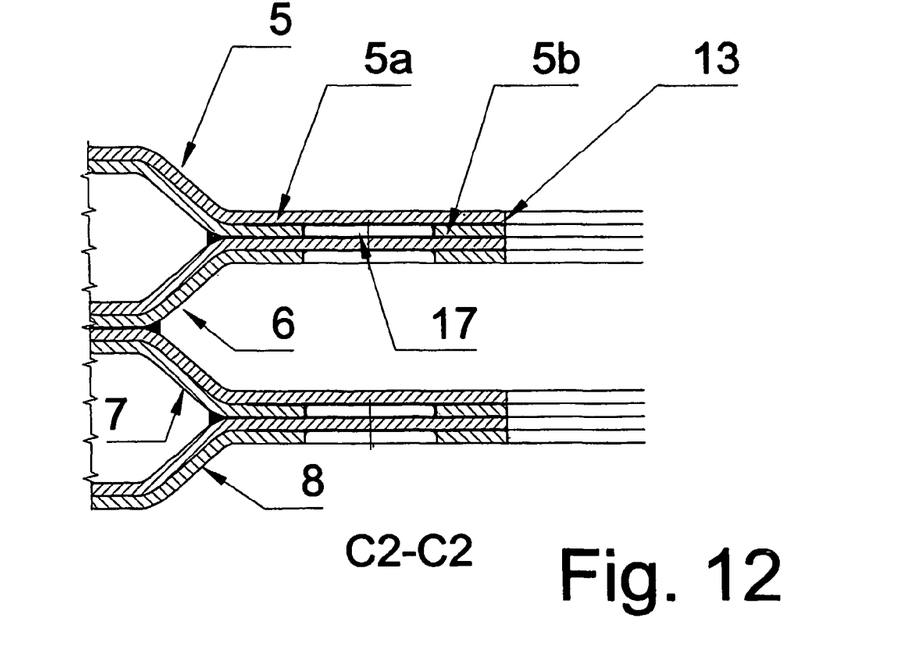
FIG. 12 corresponds to FIG. 10, but shows the condition after brazing.
Figure 13:
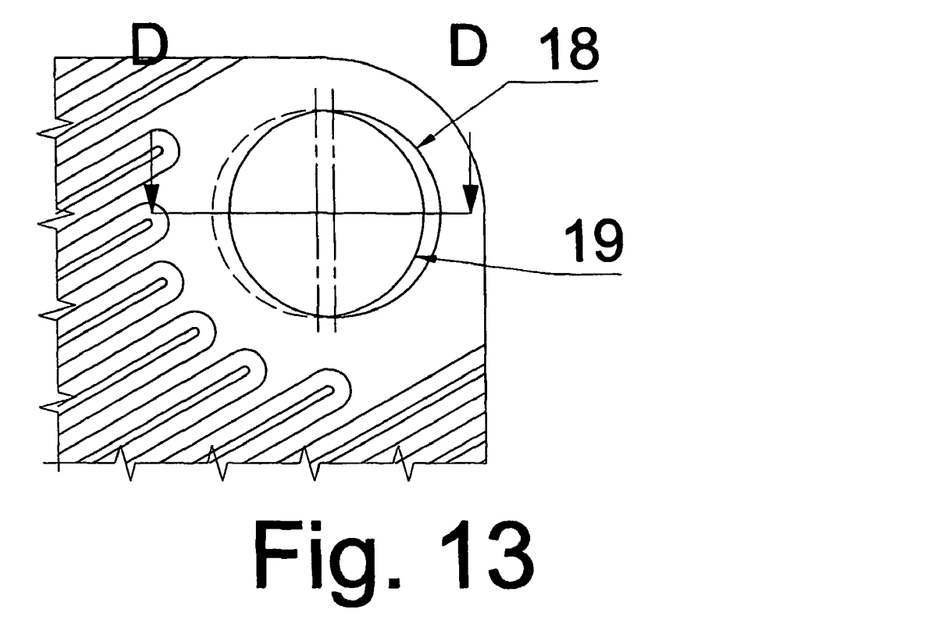
FIG. 13 shows a further embodiment of an alternative to the one shown in FIG. 3.
Figure 14:
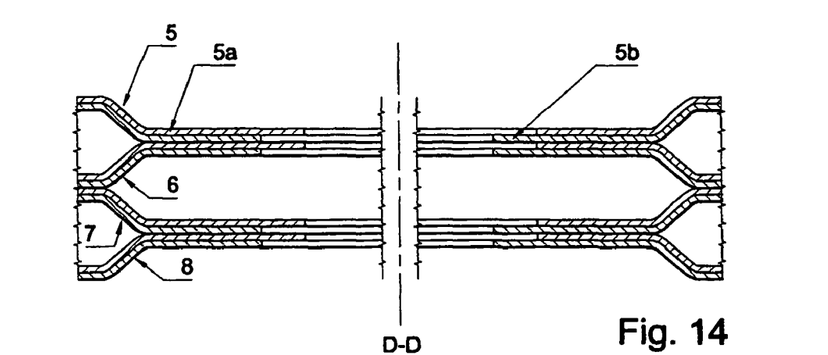
FIG. 14 is a section indicated by the arrows D-D in FIG. 13 prior to heating for brazing.
Figure 15:
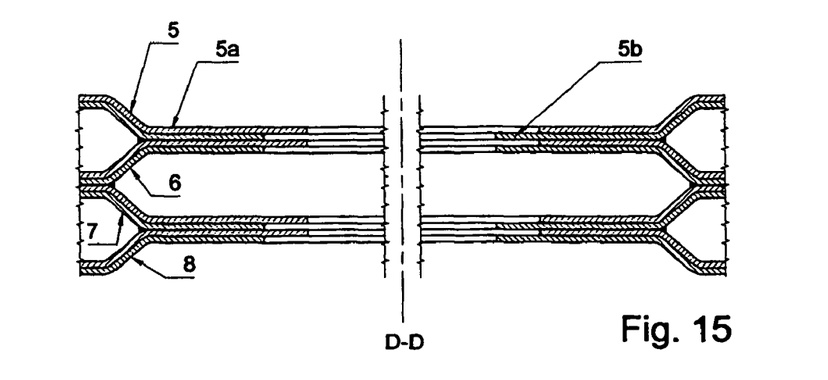
FIG. 15 is a section indicated by the arrows D-D in FIG. 13 after heating for brazing.
Figure 16:
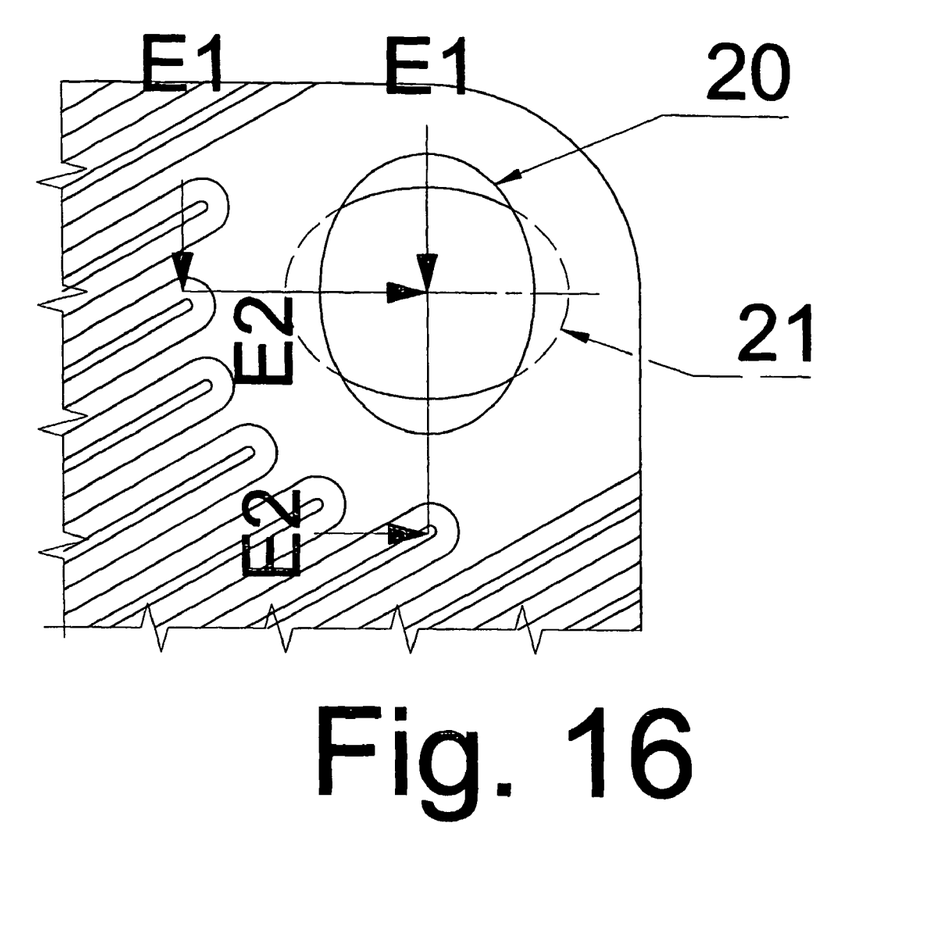
FIG. 16 shows a still further embodiment of an alternative to the one shown in FIG. 3.

FIG. 8 is a plan view of a part of a heat exchanger plate corresponding to that of FIG. 3 i.e. as shown by the arrows B-B in FIG. 2, but showing an alternative way of providing capillary suction. FIGS. 9 and 10 are sections indicated by the arrows C1-C1 respectively C2-C2 in FIG. 8. The free areas continuing in narrow gaps between two surfaces are provided by four holes 16 in the wall 5a and by four holes 17 in the wall 5b. The FIGS. 11 and 12 illustrate how brazing material by capillary suction has entered between the two walls of each heat exchanger plate after melting the brazing material in a vacuum oven according to the traditional way of connecting stacked plates in the manufacture of plate heat exchangers. The brazing material has been shown by thick lines A further example of providing sealing by capillary suction of brazing material has been illustrated in the FIGS. 13-15. Here it is shown how a port hole border 18 in the wall 5a and a port hole border 19 in the wall 5b are relatively displaced and thus forming the free areas providing the capillary suction. FIGS. 14 and 15 are both sections indicated by the arrows D-D i FIG. 13 and they show the location of brazing material prior to respectively after the heating for brazing.

Figure 17:
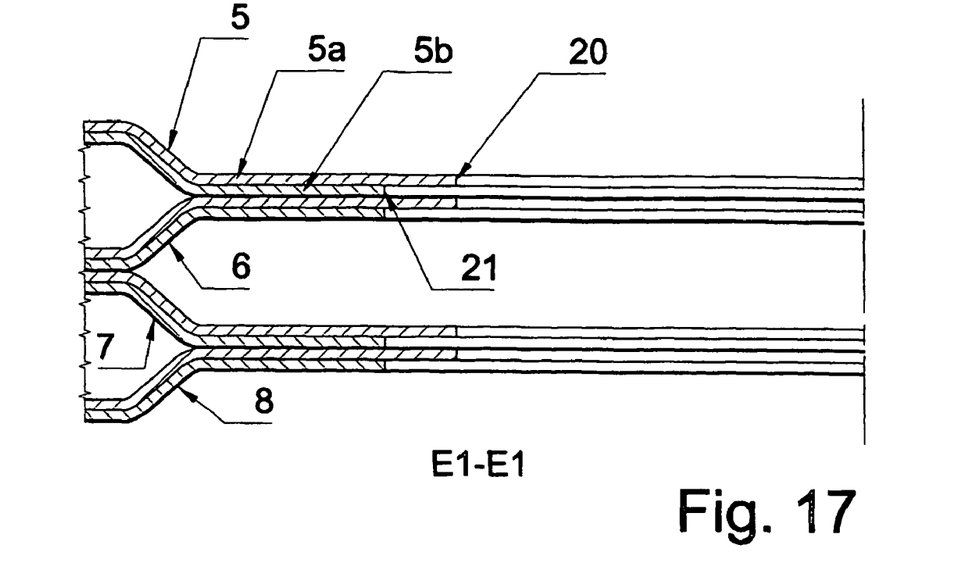
FIG. 17 is a section indicated by the arrows E1-E1 in FIG. 16 prior to heating for brazing.
Figure 18:
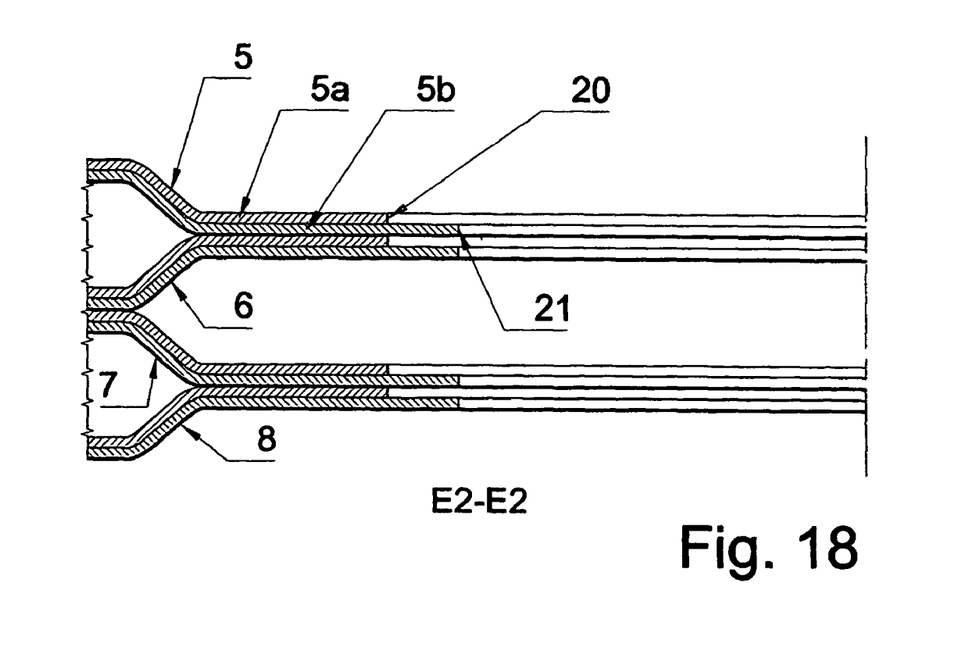
FIG. 18 is a section indicated by the arrows E2-E2 in FIG. 16 prior to heating for brazing.
Figure 19:
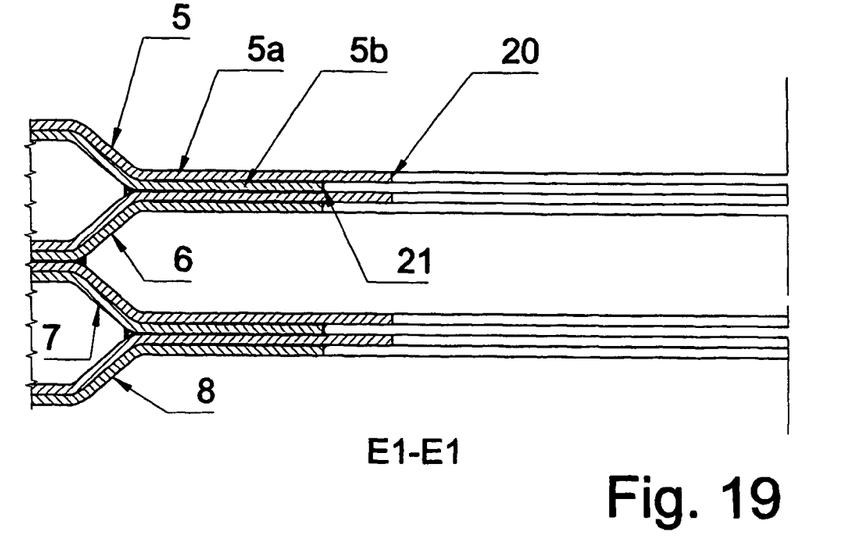
FIG. 19 is a section indicated by the arrows E1-E1 in FIG. 16 after heating for brazing.
Figure 20:
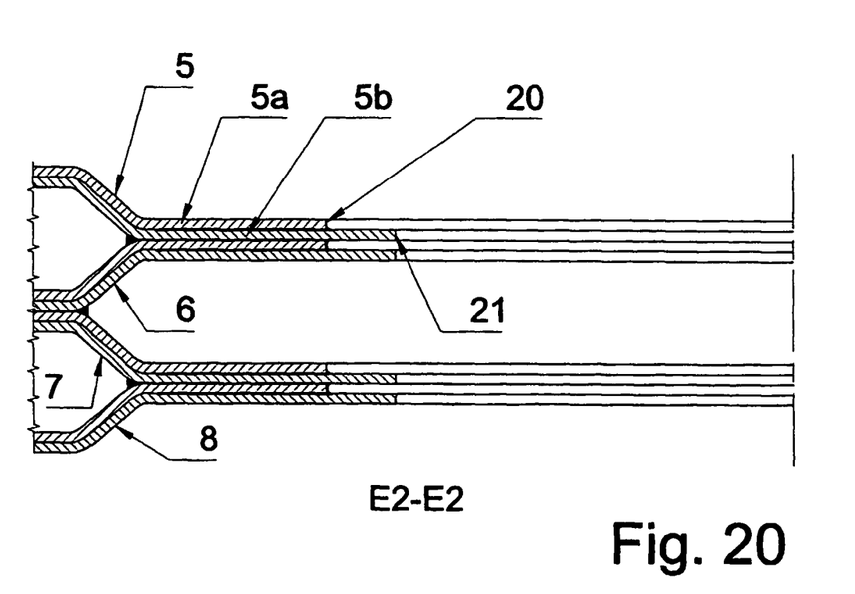
FIG. 20 is a section indicated by the arrows E2-E2 in FIG. 16 after heating for brazing.

A still further example is shown in the FIGS. 16-20. Port hole borders 20, 21 in the two walls 5a and 5b forming the exchanger plate 5 are elliptic and placed so as to establish free wall areas adjacent to the areas of the walls contacting each other. FIGS. 17 and 19 show the distribution of the brazing material prior to respectively after the heating in the brazing oven along the section indicated by the arrows E1-E1 in FIG. 16. FIGS. 18 and 20 are corresponding illustrations regarding a section indicated by arrows E2-E2 in FIG. 16.

The invention claimed is:

1. A method of manufacturing a plate heat exchanger comprising providing a plurality of stacked plates which limit heat exchange of two or more separate fluids across said plates, said plates each including a double wall configuration to prevent one or more of said two or more fluids from leaking through a wall of the plates and entering a path of an other of said one or more of said two or more fluids; sealingly interconnecting the double walls of each of said plates around borders of port holes in the plates; providing to each plate of the stacked plates, prior to being brazed, brazing material on a surface thereof which engages a surface of another plate of said stacked plates; and configuring areas of mutually contacting wall surfaces of two of said plates forming a double wall plate around borders of a port hole to only partly cover each other; wherein the borders of the port holes in walls engaging each other in a plate have equal diameters and are provided with relatively displaced indentations.

2. A method according to claim 1, wherein areas around the borders of the port holes of two walls in a heat exchange plate include holes and said holes in one wall are angularly displaced relative to said holes in another wall.

3. A method according to claim 1, wherein the double wall of said plates are provided with relatively displaced port holes leaving free areas adjacent to contacting surface areas around a port hole opening.

4. A method according to claim 1, wherein two holes in a pair of walls forming a port hole in a heat exchanger plate are elliptical in shape and are angularly displaced.

* * * * *